Jan. 20, 1970
D. E. WEAVER
3,491,070
2-ETHYLHEXYL ACRYLATE-N-OCTYL ACRYLAMIDE-
METHACRYLAMIDE/ACRYLAMIDE TERPOLYMER
Filed Nov. 25, 1966
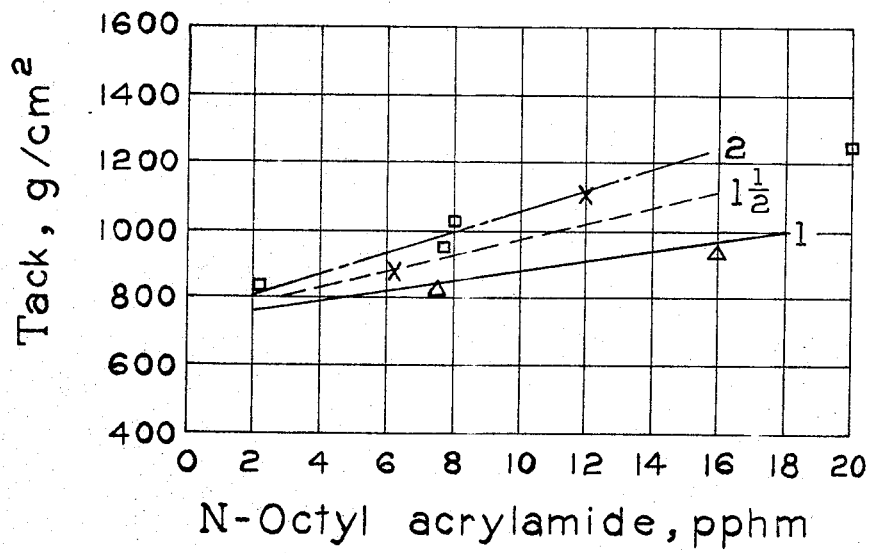
INVENTOR.
DAVID E. WEAVER
BY
Albert C. Dixon
ATTY.

United States Patent Office 3,491,070
Patented Jan. 20, 1970

3,491,070
2 - ETHYLHEXYL ACRYLATE - N - OCTYL ACRYLAMIDE - METHACRYLAMIDE / ACRYLAMIDE TERPOLYMER
David E. Weaver, Avon Lake, Ohio, assignor to The B. F. Goodrich Company, New York, N.Y., a corporation of New York
Filed Nov. 25, 1966, Ser. No. 596,970
Int. Cl. C07f 29/46; C09j 3/14
U.S. Cl. 260—80.73
1 Claim

ABSTRACT OF THE DISCLOSURE

This invention is related to adhesive compositions comprising polymer compositions based on an acrylate monomer, and two acrylamide monomers. More specifically it is related to terpolymers of 2-ethylhexyl acrylate, N-octyl acrylamide and methacrylamide. The compositions are useful as pressure sensitive adhesives and show unexpected properties in ease of manufacture.

BACKGROUND OF THE INVENTION

It is known that a copolymer of either octyl acrylate or 2-ethylhexyl acrylate with N-tertiary butyl acrylamide yields a pressure sensitive adhesive composition that has high peel strength, great tack and the ability to reseal. Such an adhesive is particularly desirable for sealing sponge rubber backed carpeting to floor surfaces. The carpet is attached securely enough to the floor that very heavy loads can be shifted across the carpet without buckling or wrinkling it, and yet a man can roll the carpet up without undue effort and then reseal it to the same or another convenient floor area merely by unrolling the carpet and seeing that it is smoothed down on the floor. Difficulties have been encountered in the preparation of these copolymers in a useful copolymer composition range because N-tertiary butyl acrylamide has limited solubility in water and in 2-ethylhexyl acrylate. The reaction temperature is difficult to control and the acrylamide monomer is quite costly.

Substituting less expensive acrylamides for the N-tertiary butyl acrylamides does not provide completely satisfactory solutions to the problems. Copolymers of 2-ethylhexyl acrylate with N-octyl acrylamide or methacrylamide can be made without the processing difficulty, but they have only limited utility because of their minimum quality as pressure sensitive adhesives.

SUMMARY OF THE INVENTION

It has been discovered that a specific combination of two particular acrylamide material with 2-ethylhexyl acrylate creates a combination that is synergistic in nature. Excellent pressure sensitive adhesives with good tack and reseal properties are obtained from this combination.

The monomers of the polymer composition of this invention, 2-ethylhexyl acrylate, N-octyl acrylamide (1,1,3,3-tetramethyl-N-butyl acrylamide) and methacrylamide, are known materials available on the market. Acrylamide may be substituted for methacrylamide. Neither of the acrylamides mentioned here gives a very satisfactory adhesive composition when combined alone with 2-ethylhexyl acrylate. The three monomers must be present in the adhesive composition, and the preferred range by weight percent therein is 2-ethylhexyl acrylate 80–96, N-octyl acrylamide 2.0–19, methacrylamide 1–4. These monomers polymerize readily in a water emulsion system. It is further preferred that the sum of the parts of N-octyl acrylamide and methacrylamide be 4 or more parts per 100 parts monomers. These ratios results in a tack strength of greater than 800 g./cm.$^2$ as measured in the tack test. Adhesives with tack strength below about 800 g./cm.$^2$ are not highly considered.

A charge of water, emulsifier, dispersant, catalyst and monomers is placed in the reactor. The polymerization is run at 70° C.–85° C. The terpolymer forms into a latex product and remains suspended as colloidal size particles until the latex is applied in some end use as a pressure sensitive adhesive.

The adhesive compositions of this invention are evaluated by a tack test as follows: The tack test is performed on a laboratory-constructed tackmeter consisting of a simple triple beam balance suspended 10 inches above a scissors jack. A cylindrical metal rod, eight inches long, with one end ground to a pencil-like one-sixteenth inch diameter point, is suspended from the balance pan. Test adhesive films are prepared by putting a known volume of test adhesive into exactly similar shaped open cup molds and oven drying the films at 100° C. Each test film is placed in contact at its center point with the contact rod of the tackmeter by raising the film in its mold up to the contact rod on the jack. Contact is maintained with no increase in pressure for a standard length of time (60 seconds is sufficient). Polymers from which the films are made for comparison should have percent total solids in the same general range, plus or minus 5%. After a contact time of one minute, one-half gram weights are added to the balance at uniform time intervals (usually 5 seconds) until sufficient weight causes the contact rod to break loose from the tacky, dried polymer film. This weight has to overcome only the film's tack which, after substracting the tare weight of contact rod, is a direct measurement of tack and is easily converted to gms./sq. cm. of force. Each film is prepared and tested in the same manner.

Cohesive quality of adhesion polymers is evaluated by measuring polymer plasticity. The measurement is made in a 100° F. constant temperature oven and is reported as thickness in millimeters of a 2 gram ball of polymer after standing for 14 minutes under a 5 kg. load. A Williams plasticity apparatus is used to make the measurements. Tack and plasticity of these material are found to increase in approximately straight line relationship with each other.

An adhesive peel test is also employed to evaluate the adhesive compositions of the invention. An adhesive film is cast on an aluminum sheet using a #40 wire wound rod, air dried at room temperature for about 30 minutes, then at 212° F. for 10 minutes, and pressed to a Mylar film under a standard load of 4½ pounds from a roller 2½ inches wide. The roller is passed over the laminate one time in each direction at a rate of 12 inches/min. The aluminum-Mylar laminate is pulled at 12" per minute on a Twing-Albert tensile tester. Results are reported in oz./in. width and type of failure is noted.

It has been learned that increases in amount of either of the acrylamide monomers lead to higher tack values in the ultimate products. Maximum levels of the acrylamide monomers are determined by formation of excessive amounts of reactor coagulum in the case of methacrylamide and by the limit of solubility of N-octyl acrylamide in 2-ethylhexyl acrylate. When tack quality in g./cm.$^2$ is plotted against parts per hundred of monomers of N-octyl acrylamide, tack increases with increasing acrylamide. If successively larger amount, 0.5, 1, 1.5, 2 and more parts, of methacrylamide are incorporated with the step up in amount of N-octyl acrylamide, a family of line plots is produced with the family containing any given parts methacrylamide displaying higher tack than any other terpolymer containing a lesser amount of methacrylamide and the same amount of N-octyl acrylamide.

DESCRIPTION OF THE DRAWING

The attached drawing illustrates these curves. It is apparent that a variety of compositions will produce polymer with a tack value of 1000 g./cm.$^2$, for instance, 8 parts N-octyl acrylamide, 2 parts methacrylamide, and 90 parts 2-ethylhexyl acrylate or 17½ parts N-octyl acrylamide, 1 part methacrylamide, and 81½ parts 2-ethylhexyl acrylate. Use of N-octyl acrylamide with 2-ethylhexyl acrylate alone has not proved to be practical because the tack strength is too low.

When the level of 2-ethylhexyl acrylate is held constant and the amounts of N-octyl acrylamide and methacrylamide are varied with respect to each other, but with the sum of their parts per hundred of monomer, p.p.h.m., always equal to 100 p.p.h.m. 2-ethylhexyl acrylate, it is found that higher amounts of methacrylamide give higher tack values. It is preferred that the sum of the parts of N-octyl acrylamide and methacrylamide be at 4 in order to insure a terpolymer composition with a tack level of 800 or more g./cm.$^2$.

PREFERRED EMBODIMENTS

The following examples will serve to illustrate the invention.

EXAMPLE I

Water, dispersant, emulsifier, catalyst and monomers are charged to a glass three liter vessel equipped for temperature control. The reaction is carried out at atmospheric pressure and 80° C. for three hours. The terpolymer forms as a latex. The general recipe is set forth in Table 1 and the tack results in Table 2.

TABLE 1

| Material: | Parts |
|---|---|
| Water | 100 |
| Ammonium nonyl phenol polyether sulfate | 2.5 |
| Ammonium sulfonate of naphthalene-formaldehyde condensate | 1.0 |
| Mixed monomers | 100 |
| Ammonium persulfate | 0.18 |

TABLE 2

| | Parts | | | Percent Combined Nitrogen | Tack, g./cm.$^2$ | Theoretical, Percent Nitrogen | Peel Strength, oz./in. |
|---|---|---|---|---|---|---|---|
| | 2-ethylhexyl acrylate | N-octyl acrylamide | Methacrylamide | | | | |
| Sample: | | | | | | | |
| A | 90 | 10 | 0 | 0.85 | 737 | | |
| B | 95.8 | 2.2 | 2.0 | 0.57 | 836 | 0.50 | |
| C | 91.5 | 7.5 | 1.0 | 0.81 | 828 | 0.74 | |
| D | 90.3 | 7.7 | 2.0 | 1.12 | 955 | 0.92 | 40 |
| E | 90.0 | 8.0 | 2.0 | 1.02 | 1,135 | | |
| F | 88.7 | 10.3 | 1.0 | 0.97 | 920 | 0.95 | |
| G | 86.5 | 12.0 | 1.5 | 1.23 | 1,110 | | 40 |
| H | 83.0 | 16.0 | 1.0 | 1.48 | 935 | | |
| I | 80.0 | 18.0 | 2.0 | 1.75 | 1,250 | | 41 |
| J | 80.0 | 16.0 | 4.0 | 1.69 | 1,525 | | |

Study of these data indicates that when only one acrylamide monomer is polymerized with 2-ethylhexyl acrylate, the resulting adhesive composition has a low tack value of less than 800 g./cm.$^2$ or less (A). As the amount of N-octyl acrylamide rises from 2 parts to 7.5 parts per 100 parts of monomers charged, the tack value shows little or no increase (B, C). Surprisingly, when the level of N-octyl acrylamide is 7.5 parts and above per 100 parts monomer charged, the tack level is significantly higher—in the neighborhood of 1000 g./cm.$^2$ or more (D–J). As the level of N-octyl acrylamide stays above 7.5 parts per hundred of monomer charged, and the level of methacrylamide is increased from 1 to 4 parts per hundred of monomer charged, tack increases consistently (H, I, J).

EXAMPLE 2

The procedure of Example 1 is followed but the reactor is scaled up from 3 liter size to 15 gallon size.

TABLE 3

| | K | L | M |
|---|---|---|---|
| Monomer: | | | |
| 2-ethylhexyl acrylate, parts | 90 | 85 | 80 |
| N-octyl acrylamide, parts | 8.9 | 14.1 | 19.3 |
| Methacrylamide, parts | 1.1 | 0.9 | 0.7 |
| Test results: | | | |
| Tack, g./cm.$^2$ | 938 | 888 | 863 |
| Williams plasticity, mm | 2.76 | 2.45 | 2.11 |
| Peel strength, oz./in | 41 | 40 | 41 |

EXAMPLE 3

The procedure of Example 1 is followed again, this time scaled up to a 175 gallon reactor level. The monomer emulsion is metered over a 4 hour period.

TABLE 4

| Monomers | |
|---|---|
| 2-ethylhexyl acrylate, parts | 86.5 |
| N-octyl acrylamide, parts | 16.5 |
| Methacrylamide, parts | 1.0 |
| Test results: | |
| Tack g./cm.$^2$ | 940 |
| Peel strength oz./in. | 41 |
| Williams plasticity | 2.00 |

The examples show that the process of the invention, combining two specific acrylamide monomers in certain preferred ranges with 2-ethylhexyl acrylate, produces terpolymer compositions with excellent pressure sensitive adhesive characteristics. The process furthermore lends itself completely to scale up and development from laboratory size to pilot plant level.

I claim:
1. A random terpolymer composition, with excellent pressure sensitive adhesive characteristics comprising the parts by weight combination of 80–96 parts 2-ethylhexyl acrylate, 2.0–19 parts N-octyl acrylamide (1,1,3,3-tetramethyl-N-butyl acrylamide) and 1–4 parts of a material selected from the group consisting of acrylamide and methacrylamide, the sum of the parts of said N-octyl acrylamide and methacrylamide or acrylamide being equal to at least 4.

References Cited

UNITED STATES PATENTS 3,299,010  1/1967  Samour _____ 260—78

JOSEPH L. SCHOFER, Primary Examiner

STANFORD M. LEVIN, Assistant Examiner

U.S. Cl. X.R.

161—219; 260—86.1

PO-1050
(5/69)

UNITED STATES PATENT OFFICE
CERTIFICATE OF CORRECTION

Patent No. 3491070          Dated January 20, 1970

Inventor(s) DAVID E. WEAVER

It is certified that error appears in the above-identified patent and that said Letters Patent are hereby corrected as shown below:

Column 1, line 53, for "material", read --materials--; line 72, for "results" read --result--. Column 2, line 21, for "firm", read --film--; line 43, for "material", read --materials--; line 66, for "amount", read --amounts--. Column 4, line 19, table 4, over data column, insert --N--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents